United States Patent [19]

Peters et al.

[11] Patent Number: Re. 31,894

[45] Reissued Date of Patent: May 21, 1985

[54] MODULAR GUIDED BEAM FLAT DISPLAY DEVICE

[75] Inventors: Kenneth D. Peters, Merritt Island, Fla.; Charles H. Anderson, Rocky Hill, N.J.

[73] Assignee: RCA Corporation, New York, N.Y.

[21] Appl. No.: 141,070

[22] Filed: Apr. 17, 1980

Related U.S. Patent Documents

Reissue of:

[64] Patent No.: 4,145,633
Issued: Mar. 20, 1979
Appl. No.: 796,337
Filed: May 12, 1977

[51] Int. Cl.[3] ..... H01J 29/46

[52] U.S. Cl. ..... 313/422; 313/400

[58] Field of Search ..... 313/400, 422

[56] References Cited

U.S. PATENT DOCUMENTS

| | | | |
|---|---|---|---|
| 3,935,500 | 1/1976 | Oess et al. | 313/422 |
| 4,028,582 | 6/1977 | Anderson et al. | 313/422 |
| 4,099,087 | 7/1978 | Peters | 313/422 |

*Primary Examiner*—David K. Moore
*Attorney, Agent, or Firm*—Eugene M. Whitacre; Dennis H. Irlbeck; Lester L. Hallacher

[57] ABSTRACT

An evacuated envelope having a plurality of spaced, parallel support walls extending between and substantially perpendicular to flat substantially parallel front and back walls to provide a plurality of parallel channels extending along the front and back walls. The front and back walls and the support walls are of an electrically insulating material, typically glass. Compressed between each of the support walls and the front wall is a metal strip which serves as the tip of the support wall and which extends along the entire length of the support wall. Each tip is tapered in thickness from a thickness substantially equal to the thickness of the support wall at the support wall to a thinner thickness at the front wall. Means is provided between each metal tip and either the support wall or the front wall to prevent movement of the tip transversely of the channels. A shadow mask extends across each of the channels and extends between the metal tips and the support walls. The shadow mask is held in proper position with respect to the phosphor screen on the inner surface of the front wall by the metal tips.

14 Claims, 8 Drawing Figures

MODULAR GUIDED BEAM FLAT DISPLAY DEVICE

Matter enclosed in heavy brackets [ ] appears in the original patent but forms no part of this reissue specification; matter printed in italics indicates the additions made by reissue.

BACKGROUND OF THE INVENTION

The present invention relates to a flat panel display of the modular guided beam type, and particularly to such a display in which the contact between the support walls and phosphor screen is minimized and good support for a shadow mask is provided.

There has been developed a flat display device which includes an evacuated envelope having substantially flat, spaced front and back walls and spaced, parallel support walls extending between the front and back walls. The support walls form a plurality of parallel channels extending across the front and back walls. A gun structure extends across one end of the channels and is adapted to generate electrons and direct the electrons as beams into the channels. In each of the channels is at least one beam guide which confines the electrons in the beam as the beam flows along the channels but which permits the beam to be deflected toward a phosphor screen on the surface of the front wall at a plurality of points along the channel. Such a display device is described in the copending application for U.S. Patent of T. O. Stanley, Ser. No. 607,492, filed Aug. 25, 1975 now U.S. Pat. No. 4,031,427, entitled "Flat Cathode Ray Tube". This type of display device will be generally referred to as a "guided beam display device".

In the copending application for U.S. Letters Patent of C. H. Anderson et al., Ser. No. 615,353, filed Sept. 22, 1975, now U.S. Pat. No. 4,028,582 entitled "Guided Beam Flat Display Device" there is shown and described a type of the guided beam flat display device in which at each point that the beams are deflected out of their focusing guides toward the phosphor screen the beams in each channel are simultaneously deflected transversely across their respective channels to scan the screen across the entire lateral dimension of the channels. This display device includes two spaced parallel grids between the focusing guides and the phosphor screen, one of the grids is for focusing the cross sectional area of the beams and the other grid is for accelerating the beam toward the phosphor screen. This type of the guided beam display device will be referred to as a "modular guided beam display device". For a color modular guided beam display device there are three beams in each channel and a shadow mask extends across each channel adjacent the phosphor screen.

One problem with the modular guided beam display device is that the area of contact between the support walls and the phosphor screen on the front wall must be minimized so that the support walls do not obscure too much of the phosphor screen. For this purpose it would be desirable to have the support walls as thin as possible. However, the thickness of the support walls, which are typically of glass, is limited in order that they will provide the necessary support against the atmospheric pressure loading. The support walls cannot be made entirely of metal because of electrical isolation requirements within the evacuated envelope. Therefore, it is desirable to have a structure which will provide the necessary support within the envelope and have a minimized width, and hence, area of contact with the phosphor screen.

Another requirement in the modular guided beam flat display device is with regard to the shadow mask. It is desirable that the device be of a structure which provides for ease of mounting the shadow mask in the envelope at the proper distance from the phosphor screen and be held with great precision laterally with respect to the screen.

SUMMARY OF THE INVENTION

A display device includes an evacuated envelope having spaced, substantially parallel front and back walls and spaced, substantially parallel support walls extending between and substantially perpendicular to the front and back walls with the support walls forming a plurality of parallel channels extending along the front and back walls. A separable metal tip is compressed between the front wall and each of the support walls and extends along the support wall. Each of the tips has a thickness substantially equal to the thickness of the support wall at the support wall and tapers to a thinner thickness at the front wall. Means is provided for preventing the tips from movement in a direction transverse of the channels so as to maintain the tips in position with respect to the support walls.

DETAILED DESCRIPTION OF THE INVENTION

Figure 1:
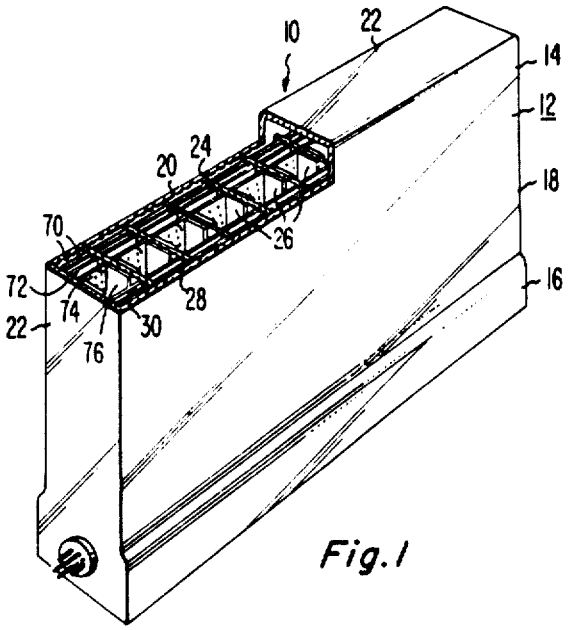
FIG. 1 is a perspective view, partially broken away of a form of the display device of the present invention.

Referring to FIG. 1, one form of a flat display device of the present invention is generally designated as 10. The display device 10 comprises an evacuated envelope 12, typically of glass, having a display section 14 and an electron gun section 16. The display section 14 includes a rectangular, substantially flat front wall 18 which supports the viewing screen, and a rectangular substantially flat back wall 20 in spaced parallel relation to the front wall 18. The front wall 18 and back wall 20 are connected by side walls 22. The front wall 18 and back wall 20 are dimensioned to provide the size of the viewing screen desired, e.g. 75×100 centimeters, and are spaced apart about 2.5 to 7.5 centimeters.

A plurality of spaced, parallel support walls 24 are secured between and substantially perpendicular to the front wall 18 and the back wall 20. The support walls 24 extend from the gun section 16 to the opposite side wall 22. The support walls 24 provide the desired internal support for the evacuated envelope 12 against external atmospheric pressure and divide the display section 14 into a plurality of parallel channels 26.

On the inner surface of the front wall 18 is a phosphor screen 28. The phosphor screen 28 may be of any well known type presently being used in cathode ray tubes, e.g. black and white or color television display tubes. However, for a color display device, the phosphor screen 28 is preferably formed of a plurality of spaced, parallel strips of phosphors which emit different colors, i.e. red, blue and green, extending longitudinally along the channels 26. Between the phosphor strips is a black matrix material with a portion of the black matrix material extending along each of the support walls 24. A metal film electrode 30 is provided on the phosphor screen 28.

Figure 2:
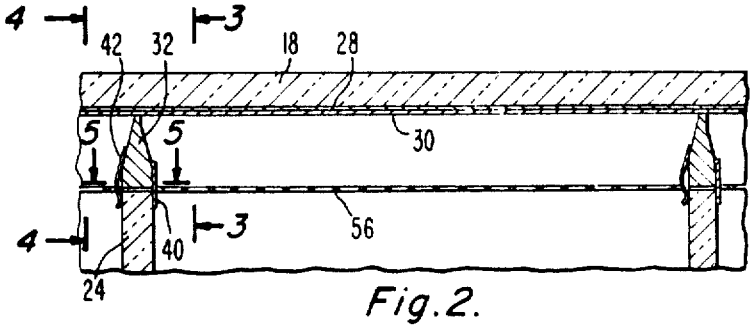
FIG. 2 is a sectional view transversely across a portion of one of the channels of the display device.
Figure 3:
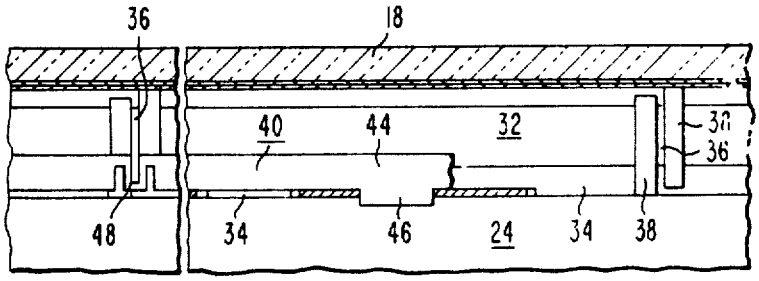
FIG. 3 is a sectional view, partially broken away, longitudinally along a portion of one of the channels taken along line 3—3 of FIG. 2.
Figure 4:
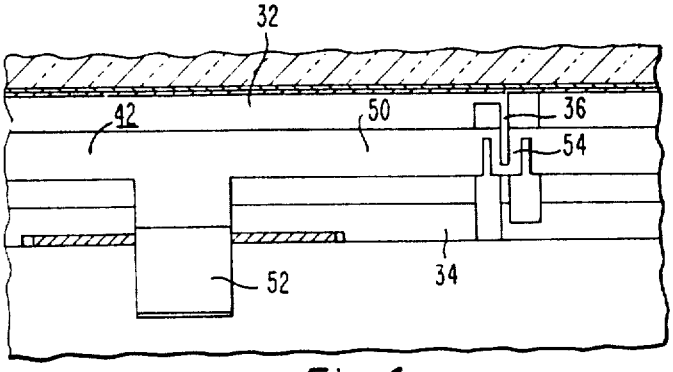
FIG. 4 is a sectional view longitudinally along a portion of one of the channels taken along line 4—4 of FIG. 2.

As shown in FIG. 2, between each of the support walls 24 and the front wall 18 is a metal strip 32 which serves as a tip for the support wall and which extends the full length of the support wall 24. Each of the metal tips 32 is of a thickness at the support wall substantially equal to the thickness of the support wall 24 and tapers to a thinner thickness at the front wall 18. As shown in FIGS. 3 and 4, each metal tip 32 has a plurality of feet 34 projecting front and spaced longitudinally along its thicker end surface, which feet rest against the support wall 24. As shown in FIG. 3, each metal tip 32 has thin, flexible web portions 36 at longitudinally spaced intervals therealong. Each of the web portions 36 is formed by two closely spaced recesses 38 extending transversely across the metal tip 32, one recess extending from the thicker end and the other recess extending from the thinner end. The flexible web portions 36 serve to permit longitudinal movement of the metal tip 32 which may result from the difference in the coefficients of thermal expansion of the metal tip 32 and the glass walls 18 and 24.

As shown in FIG. 2, each metal tip 32 has a retainer member 40 along one of its elongated sides, and a spring member 42 along its other elongated side. The retainer member 40 includes a mounting strip 44 extending along and secured to the side of the metal tip 32 at the thicker end of the tip. Retainer tabs 46 extend from the mounting strip 44 at longitudinally spaced points along the mounting strip. The retainer tabs 46 extend beyond the thicker end of the metal tip 32 and engage the adjacent side of the support wall 24 as shown in FIGS. 2 and 3. The retainer tabs 46 are positioned longitudinally between the feet 34 of the metal tips 32. As shown in FIG. 3, the mounting strip 44 has a thin flexible web portion 48 at longitudinally spaced points therealong to permit longitudinal movement of the mounting strip along with such movement of the metal tip 32. The web portions 48 are positioned at the web portions 36 of the metal tip 32.

As shown in FIG. 4, the spring member 42 includes a mounting strip 50 extending along and secured to its respective side of the metal tip 32 and spring tabs 52 extending from the mounting strip 50 beyond the thicker end of the metal tip 32 and engaging the adjacent side of the support wall 24. The spring tabs 52 are spaced longitudinally along the mounting strip 50 with each of the spring tabs 52 being positioned opposite a retainer tab 46. The mounting strip 50 has thin resilient web portions 54 at longitudinally spaced points therealong. The web portions 54 are positioned at the web portions 36 of the metal tip 32 so as to allow expansion or contraction of the spring member 42 along with the metal tip 32. The spring tabs 52 engage the side of the support wall 24 with sufficient force so as to pull the retainer tabs 46 tightly against their respective sides of the support wall 24. Thus, the metal tips 32 are held on the support walls 24 so as to prevent movement of the metal tips laterally of the channels and to properly align the thinner ends of the metal tips with respect to the phosphor screen 28. The metal tips 32 are compressed between the front wall 18 and the support walls 24 by the atmospheric pressure loading on the envelope 12.

Figure 5:
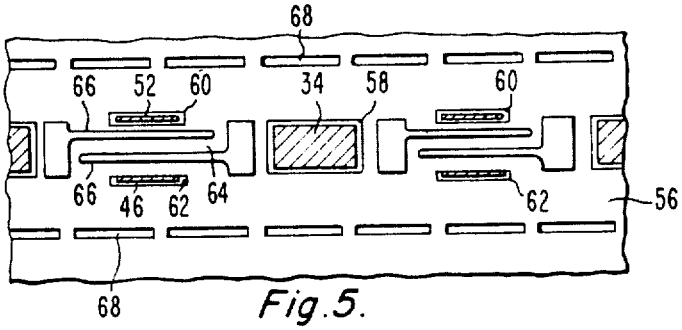
FIG. 5 is a sectional view along a portion of the channel taken along line 5—5 of FIG. 2.

As shown in FIG. 2, a shadow mask 56 extends across the channels 26 along substantially the entire length of the channels. The shadow mask 56 extends between the support walls 24 and the metal tips 32 so as to secured in spaced, parallel relation to the phosphor screen 28. As shown in FIG. 5, the shadow mask 56 has a plurality of openings 58 therethrough spaced longitudinally along the support wall 24. The feet 34 of the metal tips 32 extend through the openings 58. The shadow mask 56 also has pairs of parallel, slit shaped openings 60 and 62 along each of the metal tips 32 and between the openings 58. Each of the openings 60 is adapted to receive one of the spring tabs 52 and each of the openings 62 is adapted to receive one of the retainer tabs 46. Between each pair of openings 60 and 62 is a resilient web portion 64 formed by a pair of spaced, longitudinally extending slits 66. The web 64 serve to permit expansion or contraction of the shadow mask 56. In the portions of the shadow mask 56 between the support walls 24 are the shadow mask openings 68. For a phosphor screen 28 made up of spaced longitudinally extending strips, the shadow mask openings 68 are arranged in longitudinally extending rows which correspond in number to the number of the phosphor strips. As shown in FIG. 5, the openings 58 and 60 are larger than the metal tip feet 34 and spring tabs 52 respectively so that the spring tabs and metal tip feet can fit freely through their respective openings. However, the openings 62 are of a size and so positioned that the retainer tabs 46 engage an edge of the openings 62 so as to position the shadow mask 56 transversely with respect to the phosphor screen 28. Thus, the shadow mask openings 68 are aligned with the phosphor screen 28.

As shown in FIG. 1, along each of the channels 26 adjacent the back wall 20 is an assembly which includes a pair of electron beam focusing guide grid plates 70, a focusing grid 72 and an acceleration grid 74 secured together in spaced apart parallel relation. Such an assembly and the manner of mounting it in each channel 26 is shown and described in the copending application for Letters Patent of Z. M. Andrevski, Ser. No. 775,300, filed Mar. 7, 1977, entitled "Flat Display Device With Beam Guide" *now U.S. Pat. No. 4,101,802* and in the copending application for U.S. Patent of K. D. Peters, Ser. No. 783,218, filed Mar. 31, 1977, entitled "Guided Beam Flat Display Device With Focusing Guide Assembly Mounting Means" *now U.S. Pat. No. 4,099,087*. On the surface of the support walls 24 are a deflection electrode 76 which extends between the shadow mask 56 and the acceleration grid 74 along the entire length of the channel 26.

The gun section 16 is an extension of the display section 14 and extends along one set of adjacent ends of the channels 26. The gun section may be of any shape suitable to enclose the particular gun structure contained therein. The electron gun structure contained in gun section 16 may be of any well known construction suitable for selectively directing beams of electrons along each of the channels. For example, the gun structure may comprise a plurality of individual guns mounted at the ends of the channels 26 for directing separate beams of electrons along the channels. Alternatively, the gun structure may include a line cathode extending along the gun section 16 across the ends of the channels 26 and adapted to selectively direct individual beams of electrons along the channels. A gun structure of the line type is described in U.S. Pat. No. 2,858,464 to W. L. Roberts, issued Oct. 28, 1958, entitled "Cathode Ray Tube".

The display device 10 operates in the same manner as described in the application of C. H. Anderson et al, Ser. No. 615,353 now U.S. Pat. No. 4,028,582. Three beams of electrons are directed into each of the channels 26 between the focusing guide grid plates 70. Potentials are applied to the focusing guide grid plates so as to create electrostatic forces which confine the electrons to the beams as the beams flow along the channels. The beams are selectively deflected toward the phosphor screen at various points along the channels so that the beams will pass through the shadow mask 56 and impinge on the phosphor screen. As the beams pass between the deflection electrodes 76, a potential difference is applied to the deflection electrodes which causes the beams to be deflected transversely across the channels. Thus, the beams in each of the channels are scanned across the portion of the phosphor screen 28 which extends across the respective channel so that the combined scans of the beams in all of the channels provide a complete horizontal line scan of the phosphor screen. The transverse scanning of the phosphor screen 28 is accomplished at a plurality of points along the channels to achieve a scanning of the entire phosphor screen 28. By modulating the beams at the gun structure, a display can be achieved on the phosphor screen 28 which can be viewed through the front wall 18 of the display device.

In the assembling of the display device 10, after the support walls 24 are secured to the back wall 20 and the assemblies of the grid plates 70, 72, 74 and deflection electrodes 76 are mounted in the channels 26, the shadow mask 56 can then be placed over and seated on the support wall 24. A separate metal tip 32 is then mounted on each of the support walls 24 with the retainer tabs 46 extending through the openings 62 in the shadow mask 56 and the spring tabs 52 extending through the openings 60 in the shadow mask 56. The spring tabs 52 press against the sides of the support walls 24 so as to hold the retainer tabs 46 against their respective sides of the support walls 24 and against the edges of the shadow mask slots 62. This holds the metal tips 32 in position on the support wall 24 as well as aligns the shadow mask 56 laterally with respect to the support walls. The front wall 18, which has the phosphor screen 28 and metal film electrode 30 thereon can then be placed across the metal tips 32 and sealed to the side walls 22 of the envelope 12. When the envelope 12 is evacuated, the external atmospheric pressure will press the front wall 18 and back wall 20 together so that the metal tips 32 will be compressed between the front wall 18 and the support wall 24 to firmly secure the metal tips in place.

The ends of the metal tips 32 which contact the metal film electrode 30 can be made thin so as to minimize the area of contact which may interfere with the optical output of the phosphor screen. In fact, the end of the metal tips 32 can be made thin enough so that they can be easily hidden by the black matrix between the rows of phosphor strips of a color display. However, even with such a thin end portion, the metal tips 32 will withstand the forces applied by the external pressure loading. In addition, the metal tips 32 serve to secure the shadow mask 56 in position with the openings in the shadow mask properly aligned with respect to the phosphor screen 28. Although the shadow mask 56 is shown and has been described as being a single metal sheet extending across all of the channels 26, the shadow mask 56 may be individual metal pieces each of a lateral width slightly greater than the lateral width of a channel 26 so as to extend over a portion of each of the support walls 24 on each side of the channel. Each of such individual pieces would have a plurality of openings 60 along one longitudinal edge to receive the spring tabs 52 of the metal tips 32, and a plurality of openings 62 along the other longitudinal edge to receive the retainer tabs 46 of a metal tip 32.

Figure 6:
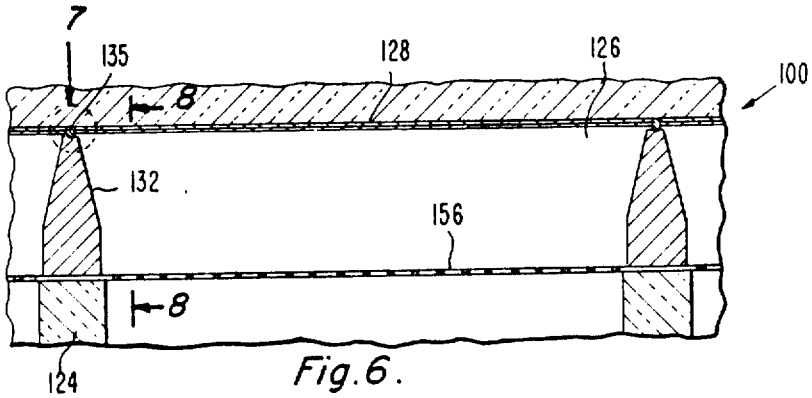
FIG. 6 is a sectional view similar to FIG. 1 but showing a modified form of the display device.
Figure 7:
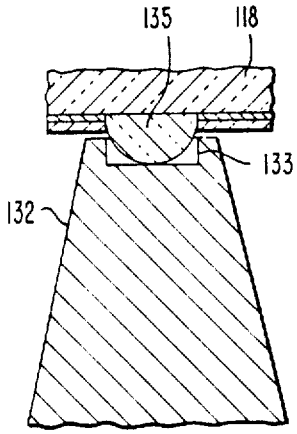
FIG. 7 is an enlarged view of the portion of the display device within the circle 7 in FIG. 6.

Referring to FIG. 6, a modification of the display device of the present invention is generally designated as 100. The display device 100 is substantially the same in structure as the display device 10 shown in FIGS. 1 and 2 except for the structure of the metal tips and the manner of holding the metal tips in position laterally. In the display device 100 the metal tips 132 are similar in construction to the metal tips 32 in the display device 10 except that the metal tips 132 do not include the retainer members and spring members for holding the metal tips on the support walls. Instead, as shown in FIG. 7 each of the metal tips 132 has a groove 133 in its thinner end which groove extends longitudinally along the entire length of the metal tip. On the inner surface of the front wall 118 are a plurality of spaced, parallel, substantially semicylindrical beads 135 of a rigid material, such as glass. The beads 135 extend longitudinally along the channels 126 with each bead being located along a separate one of the support walls 124. Each of the beads 135 fits in the groove 133 of a metal tip 132 to locate the metal tip 132 along its respective support wall 124 and to prevent movement of the metal tip laterally of the channels 126. Each of the metal tips 132 is compressed between the front wall 118 and its respective support wall 124 by the external atmospheric pressure load.

Figure 8:
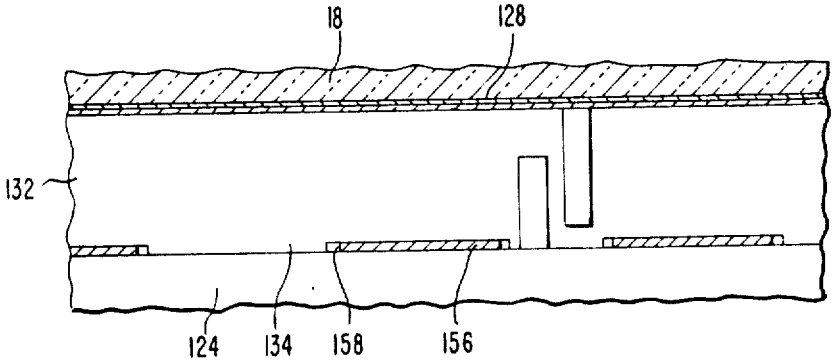
FIG. 8 is a sectional view taken along line 8—8 of FIG. 6.

As shown in FIG. 8, each of the metal tips 132 has longitudinally spaced feet 134 projecting from its thicker end. The feet 134 extend through openings 158 in the shadow mask 156 so as to be seated on the support wall 124. Some of the feet 134 have a lateral dimension equal to the lateral dimension of the openings 158 in the shadow mask 156 through which the feet extend so that the shadow mask 156 is aligned laterally with respect to the phosphor screen 128 on the front wall 118. Thus, the beads 135 on the front wall 118 align the metal tips 132 with respect to the support walls 124, which in turn aligns the shadow mask 156 with respect to the phosphor screen 128 on the front wall 118. Although the grooves 133 in the metal tips 132 are shown as being rectangular in cross section, they may be semicircular or any other shape which will snuggly receive the beads 135 to properly align the metal tips and hold them laterally in position.

[I] *We* claim:

1. A display device comprising an evacuated envelope having spaced, substantially parallel front and back walls and spaced, substantially parallel support walls extending between and substantially perpendicular to the front and back walls, said support walls forming a plurality of parallel channels extending along said front and back walls, a separable metal tip compressed between the front wall and each of said support walls and extending along the support wall, [each of said tips having a thickness at the support wall substantially equal to the thickness of the support wall and tapering to a thinner thickness at the front wall.] and means preventing movement of each of said tips in a direction transversely of the channels so as to maintain the metal tips against the support walls.

2. A display device in accordance with claim 1 in which the means for preventing the transverse movement of each tip comprises a plurality of retainer tabs spaced longitudinally along one side of the tip, said retainer tabs projecting beyond [the thicker] *one* end of the tip and engaging one side of the adjacent support wall and a plurality of spring tabs spaced longitudinally along the other side of the tip, said spring tabs projecting beyond [the thicker] *said one* end of the tip and engaging the other side of the adjacent support walls so that the spring tabs and retainer tabs clamp the support wall therebetween to hold the tip on the support wall.

3. A display device in accordance with claim [2] *1* including a shadow mask extending transversely across each channel and fitting between the metal tips and the support walls.

4. A display device in accordance with claim 3 in which the shadow mask has openings therethrough through which the spring tabs and retainer tabs extend, the spring tabs extend freely through their respective openings in the shadow mask and the retainer tabs engage an edge of their respective openings in the shadow mask to align the shadow mask with [with] respect to the front wall.

5. A display device in accordance with claim 4 in which each of the metal tips has longitudinally spaced feet projecting from [its thicker] *said one* end and the shadow mask has openings therethrough through which the feet extend to engage the respective support wall.

6. A display device in accordance with claim [2] *1* in which each of the metal tips has flexible web portions at longitudinally spaced intervals therealong.

7. A display device in accordance with claim 6 in which the shadow mask has flexible webs in the portions thereof which extend between the metal tip and the support wall.

8. A display device in accordance with claim 1 in which the means for preventing the transverse movement of the metal tips includes a groove in the [thinner] *other* end of each tip extending longitudinally along the tip and a separate bead projecting from the front wall along each support wall and fitting in the groove in the respective tip.

9. A display device in accordance with claim 8 including a shadow mask extending transversely across each channel and fitting between the support walls and the metal tips.

10. A display device in accordance with claim 9 in which each metal tip has a plurality of longitudinally spaced feet projecting from [its thicker] *said one* end and the shadow mask has openings therethrough through which the feet extend to engage the respective support walls, at least one of the feet of each metal tip engaging the edges of its respective opening in the shadow mask to align the shadow mask with respect to the front wall.

*11. A display device in accordance with claim 1 in which the means for preventing the transverse movement of each tip comprises a plurality of members arranged at longitudinally spaced points along said support walls and said metal tips, said members extending substantially perpendicular to the longitudinal axis of said support walls and said metal tips, a portion of said members engaging one side of said support walls and said metal tips and the other portion of said members engaging the other side of said support walls and said metal tips.*

*12. A display device in accordance with claim 1 in which said metal tips extend substantially the full length of said support walls and the edges of said metal tips rest against the edges of said support walls for a substantial portion of said lengths.*

*13. A display device in accordance with claim 1 in which said tips have a thickness at the support wall substantially equal to the thickness of the support wall and a thinner thickness at the front wall.*

*14. A display device in accordance with claim 11 in which said members extend substantially perpendicular to said front wall.*

* * * * *